United States Patent [19]

Banks

[11] 3,883,606

[45] May 13, 1975

[54] CONVERSION OF UNSATURATED COMPOUNDS

[75] Inventor: Robert L. Banks, Bartlesville, Okla.

[73] Assignee: Phillips Petroleum Company, Bartlesville, Okla.

[22] Filed: Oct. 4, 1971

[21] Appl. No.: 186,410

[52] U.S. Cl.......... 260/678; 260/465.9; 260/654 R; 260/666 A; 260/668 R; 260/677 R; 260/683 D; 260/680 R
[51] Int. Cl............................................... C07c 3/62
[58] Field of Search........ 260/683 D, 666 A, 677 R, 260/680 R, 673, 673.5, 678, 208/136, 141

[56] References Cited
UNITED STATES PATENTS

| 2,337,190 | 12/1943 | Greensfelder et al. | 260/673.5 |
| 2,785,209 | 3/1957 | Schmetterling et al. | 260/673.5 |
| 3,551,509 | 12/1970 | Thomas et al. | 260/673.5 |
| 3,554,924 | 1/1971 | Kittleman et al. | 260/683 |
| 3,655,804 | 4/1972 | Pennella | 260/678 |
| 3,728,414 | 4/1973 | Helden et al. | 260/683 |

FOREIGN PATENTS OR APPLICATIONS

| 1,096,200 | 12/1967 | United Kingdom | 260/683 |

Primary Examiner—Delbert E. Gantz
Assistant Examiner—C. E. Spresser

[57] ABSTRACT

The conversion of unsaturated compounds is accomplished with a catalyst comprising a rare earth metal oxide.

12 Claims, No Drawings

CONVERSION OF UNSATURATED COMPOUNDS

BACKGROUND OF THE INVENTION

This invention relates to the conversion of unsaturated compounds including the conversion of olefinic compounds according to the olefin reaction and the conversion of acetylenic compounds according to the alkyne reaction, to compositions useful as catalysts for such conversions of unsaturated compounds, and to the modification of olefin reaction and alkyne reaction catalysts.

Processes and catalysts are known for converting olefinically unsaturated compounds into other olefinic compounds by a reaction called the "olefin reaction" and for converting acetylenically unsaturated compounds into other acetylenic compounds by the "alkyne reaction". Catalysts having activity for these reactions have been studied at length for the purpose of improving their performance generally or in specific situations. For example, recently it has been found that co-promoting such catalysts with zinc oxide or with an oxide of niobium, tantalum, or vanadium results in increasing the double bond isomerization activity of such a catalyst while retaining at least some of the olefin reaction activity.

In some instances it is desirable to increase conversion according to the olefin reaction without increasing double bond isomerization. Similarly, it is desirable to increase conversion according to the alkyne reaction while suppressing isomerization.

An object of the invention is to provide compositions useful as catalysts for converting unsaturated compounds, including the conversion of olefinic compounds according to the olefin reaction and the conversion of acetylenic compounds according to the alkyne reaction. Another object of the invention is to modify the activity of catalysts active for the olefin reaction or the alkyne reaction. Another object of the invention is to convert unsaturated compounds including the conversion of olefinic compounds according to the olefin reaction and the conversion of acetylenic compounds according to the alkyne reaction.

Other aspects, objects and advantages of the invention are apparent in the written description and the claims.

SUMMARY OF THE INVENTION

According to the invention compositions are provided comprising a promoter selected from the group consisting of oxides of tungsten, molybdenum and rhenium, on a support selected from the group consisting of silica, silica-alumina, alumina and aluminum phosphate, said composition being further promoted with an effective amount of an oxide of a rare earth metal having an atomic number of from 57 through 71, inclusive. Further according to the invention unsaturated compounds are converted by contact with such catalysts including a rare earth metal oxide. Further according to the invention catalysts useful in the olefin reaction or the alkyne reaction are modified by inclusion therein of a rare earth metal oxide.

The terms "olefin reaction" and "alkyne reaction", as used herein, are defined as processes for the catalytic conversion over a catalyst of a feed comprising one or more unsaturated compounds to produce a resulting product which contains at least 10 percent by weight of product compounds, which product compounds can be visualized as resulting from at least one primary reaction, as defined below, or the combination of at least one primary reaction and at least one unsaturated bond isomerization reaction, and wherein the sum of compounds contained in the resulting product consisting of hydrogen, saturated hydrocarbons, and compounds which can be visualized as formed by skeletal isomerization but which cannot be visualized as formed by one or more of the above-noted reactions, comprises less than 25 percent by weight of the total of said resulting product. Feed components and the unsaturated bond isomers thereof are not included in the resulting product for the purpose of determining the above-noted percentages.

In the reaction of unsaturated compounds, as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third and between said second and fourth carbon atoms. Said first and second carbon atoms and said third and fourth carbon atoms can be in the same or different molecules.

When defining the olefin reaction the terms "unsaturated compounds" and "unsaturated bond" as used in the above definition include ethylenically unsaturated compounds and double bonds while, when the definition is applied to the alkyne reaction the terms include acetylenically unsaturated compounds and triple bonds.

The olefin reaction has been designated by other names including, for example, "olefin dismutation", "olefin metathesis", and "disproportionation". In the present application the terms olefin reaction, olefin dismutation, and olefin metathesis are used interchangeably to designate the reaction of acetylenically unsaturated compounds as defined hereinabove. The term disproportionation is used to define one aspect of this reaction.

The olefin reaction can be illustrated by the following reactions within the definition of the reaction:

1. The disproportionation of an acyclic mono- or polyene having at least 3 carbon atoms into other acyclic mono- or polyenes of both higher and lower number of carbon atoms; for example, the disproportionation of propylene to produce ethylene and butenes; the disproportionation of 1,5-hexadiene to produce ethylene and 1,5,9-decatriene;

2. The conversion of an acyclic mono- or polyene having 3 or more carbon atoms and a different acyclic mono- or polyene having 3 or more carbon atoms to produce different acyclic olefins; for example, the conversion of propylene and isobutylene to produce ethylene and isopentene;

3. The conversion of ethylene and an internal acyclic mono- or polyene having 4 or more carbon atoms to produce other olefins having a lower number of carbon atoms than that of the acyclic mono- or polyenes; for example, the conversion of ethylene and 4-methylpentene-2 to produce 3-methylbutene-1 and propylene;

4. The conversion of ethylene or an acyclic mono- or polyene having 3 or more carbon atoms and a cyclic mono- or cyclic polyene to produce an acyclic polyene having a higher number of carbon atoms than that of any of the starting materials; for example, the conversion of cyclooctene and 2-pentene to produce 2,10-tridecadiene; the conversion of 1,5-cyclooctadiene and ethylene to produce 1,5,9-decatriene;

5. The conversion of one or more cyclic mono- or cyclic polyenes to produce a cyclic polyene having a higher number of carbon atoms than any of the starting materials; for example, the conversion of cyclopentene to produce 1,6-cyclodecadiene; (continued reaction can give higher molecular weight materials);

6. The conversion of an acyclic polyene having at least 7 carbon atoms and having at least 5 carbon atoms between any two double bonds to produce acyclic and cyclic mono- and polyenes having a lower number of carbon atoms than that of the feed; for example, the conversion of 1,7-octadiene to produce cyclohexene and ethylene;

7. The conversion of one or more acyclic polyenes having at least 3 carbon atoms between any two double bonds to produce acyclic and cyclic mono- and polyenes generally having both a higher and lower number of carbon atoms than that of the feed material; for example, the conversion of 1,4-pentadiene to produce 1,4-cyclohexadiene and ethylene;

8. The conversion of one or more aryl substituted acyclic monoolefins to produce a diaryl substituted olefin; for example, the conversion of 1-phenylbutene-2 produces 1,4-diphenylbutene-2 and butene-2.

Any olefin which is convertible according to the olefin reaction can be used in the process of the invention. Included among those which can be used are acyclic mono- and polyenes having at least 3 carbon atoms per molecule including cycloalkyl, cycloalkenyl, and aryl derivatives thereof; cyclic mono-and polyenes having at least 4 carbon atoms per molecule including alkyl and aryl derivatives thereof; mixtures of at least two of the above olefins; and mixtures of ethylene and at least one of the above olefins. Many useful reactions are accomplished with acyclic olefins having 3–30 carbon atoms per molecule and with cyclic olefins having 4–30 carbon atoms per molecule, mixtures thereof and mixtures with ethylene.

It has been found that within the scope of this invention certain olefins react at a faster rate than other olefins. Also, in employing certain olefins higher conversions are obtained than with other olefins under comparable reaction conditions. For example, the contact of a symmetrical monoolefin with a catalyst of the invention to give different olefin products (i.e., the reactions exemplified under number (1) above) apparently requires some double bond migration to take place before the disproportionation reaction proceeds at a significant rate. For similar reasons, the conversion of a mixture of ethylene and a 1-olefin proceeds at a slower rate and lower conversion than the conversion of a mixture of ethylene and an internal olefin. It has also been found that branching or the presence of inert polar substituents sometimes decrease the reactivity of a double bond in the feed olefin as the branching or polar substituent approaches the double bond. Accordingly, the present invention is directed primarily to the conversion of those olefins or combination of olefins which are capable of undergoing the olefin reaction to a significant degree when contacted with the catalyst of the present invention under reaction conditions suitable for effecting the olefin reaction.

Among the olefins which are capable of undergoing the olefin reaction to a significant degree are those contained in the following classes:

1. Acyclic monoolefins, including those with aryl, cycloalkyl, and cycloalkenyl substituents, having 3–20 carbon atoms per molecule with no branching closer than about the 3-position to the double bond, no quaternary carbon atoms and no aromatic substitution closer than the 4-position to the double bond, and mixtures of such unsubstituted acyclic monoolefins. Some examples of these are propylene, pentene-1, pentene-2, butene-1, butene-2, 3-methylbutene-1, hexene-2, octene-4, nonene-2, 4-methylpentene-1, decene-3, 8-ethyldecene-2, dodecene-4, vinylcyclohexane, 4-vinylcyclohexene, eicosene-1, and the like.

2. A mixture of ethylene and one or more acyclic unsubstituted internal monoolefins of (1). Some examples of such mixtures are ethylene and butene-2, ethylene and pentene-2, ethylene and hexene-3, ethylene and heptene-3, ethylene and 4-methylpentene-2, ethylene and octene-4, ethylene and dodecene-4, and the like.

3. Acyclic, nonconjugated polyenes having from 5 to about 20 carbon atoms per molecule, containing from 2 to about 4 double bonds per molecule and having no double bond with branching nearer than the 3-position to that double bond, and having at least one double bond with no quaternary carbon atoms and no aromatic substitution nearer than the 4-position to that double bond, or mixtures of such polyenes. Some examples are 1,4-pentadiene, 1,5-hexadiene, 1,7-octadiene, 2,6-decadiene, 1,5,9-dodecatriene, 4-methylheptadiene-1,6, 1,6-octadiene, and the like.

4. A mixture of ethylene and one or more acyclic polyenes of (3) which contain at least one internal double bond. Some examples are ethylene and 1,6-octadiene, ethylene and 1,5-decadiene, and the like.

5. Cyclopentene.

6. Cyclic and bicyclic monoolefins having 7 to 12 ring carbon atoms, including those substituted with up to 3 alkyl groups having up to about 5 carbon atoms, with no branching closer than the 3-position and with no quaternary carbon atoms closer than the 4-position to the double bond, and mixtures of such olefins including mixtures with cyclopentene. Some examples are cycloheptene, cyclooctene, 4-methylcyclooctene, 3-methyl-5-ethylcyclodecene, cyclononene, cyclodecene, norbornene, and the like.

7. A mixture of one or more of the monocyclic olefins of (6) with either ethylene or with one or more unsubstituted acyclic monoolefins of (1). Some examples of these are ethylene and cycloheptene, ethylene and cyclooctene, propylene and cyclodecene, pentene-2 and cyclooctene, ethylene and cyclododecene, and the like.

8. Cyclic and bicyclic nonconjugated polyenes having from 5 to about 12 ring carbon atoms, including those substituted with up to 3 alkyl groups having up to about 5 carbon atoms each, having at least one double bond with no branching closer than the 3-position and with no quaternary carbon atoms closer than the 4-position to that double bond, and mixtures thereof. Some examples of these are 1,5-cyclooctadiene, 1,5,9-cyclododecatriene, 1,4-cycloheptadiene, norbornadiene, and the like.

9. A mixture of one or more monocyclic polyenes of (8) with one or more acyclic 1-olefins having from 2 to about 10 carbon atoms, having no branching nearer than the 3-position and no quaternary carbon atoms nearer than the 4-position to the double bond. Some examples of these are 1,5-cyclooctadiene and ethylene, 1,5,9-cyclodecatriene and ethylene, 1,5,9-cyclododecatriene and pentene-1, and the like.

Preferred feeds for the present process are those olefinic compounds having 10 carbon atoms or less per molecule. Still more preferred are those having 6 carbon atoms or less per molecule.

The alkyne reaction according to this invention is illustrated by the following reactions:

1. The disproportionation of an acyclic mono- or polyyne having at least three carbon atoms into other acyclic mono- or polyynes of both higher and lower number of carbon atoms; for example, the disproportionation of 2-pentyne yields 2-butyne and 3-hexyne; the disproportionation of 1,5-hexadiyne yields acetylene and 1,5,9-decatriyne;

2. The conversion of an acyclic mono- or polyyne having three or more carbon atoms and a different acyclic mono- or polyyne having three or more carbon atoms to produce different acyclic alkynes; for example, the conversion of 2-pentyne and 2-hexyne yields 2-butyne and 3-heptyne;

3. The conversion of acetylene and an internal acyclic mono- or polyyne having four or more carbon atoms to produce other alkynes having a lower number of carbon atoms than that of the acyclic mono- or polyyne; for example, the conversion of acetylene and 3-hexyne yields 1-butyne;

4. The conversion of acetylene or an acyclic mono- or polyyne having three or more carbon atoms and a cyclic mono- or cyclic polyyne to produce an acyclic polyyne having a higher number of carbon atoms than that of any of the starting materials; for example, the conversion of cyclooctyne and 2-butyne yields 2,10-dodecadiyne;

5. The conversion of one or more cyclic mono- or cyclic polyynes to produce a cyclic polyyne having a higher number of carbon atoms than any of the starting materials; for example, the conversion of cyclopentyne yields 1,6-cyclodecadiyne and continued reaction can give higher molecular weight material;

6. The conversion of an acyclic polyyne having at least 7 carbon atoms and having at least 5 carbon atoms between any two triple bonds to produce acyclic and cyclic mono- and polyynes having a lower number of carbon atoms than that of the feed; for example, the conversion of 1,7-octadiyne yields cyclohexyne and acetylene; or 7. The conversion of one or more acyclic polyynes having at least 3 carbon atoms between any two triple bonds to produce acyclic and cyclic mono- and polyynes generally having both a higher and lower number of carbon atoms than that of the feed material; for example, the conversion of 1,4-pentadiyne yields 1,4-cyclohexadiyne and acetylene.

Compounds suitable for conversion according to the present invention include cyclic, acyclic, branched and unbranched alkynes containing from 1 to about 5, preferably one, triple bond per molecule, and mixtures thereof, including mixtures with acetylene. The alkynes can be unsubstituted or can contain substituents which either because of their nature or their distance from the triple bond, do not unduly interfere with the reaction including, for example, such hydrocarbon substituents as cycloalkyl and aryl groups, and other substituents including polar substituents such as halo or cyano groups. The alkynes can also contain olefinic unsaturation.

A preferred group for conversion according to the present invention is alkynes containing from 3 to about 20 carbon atoms per molecule, but higher molecular weight materials, even polymeric materials, which contain acetylenic unsaturation can be converted. Excellent results are obtained with acyclic alkynes.

Some examples of alkynes suitable for use in the present invention are acetylene, propyne, butyne-1, butyne-2, pentyne-1, pentyne-2, 3-methyl butyne-1, hexyne-2, 4,4-dimethylpentyne-1, heptyne-1, 1,5-hexadiyne, dodecyne-1, cyclopentadecyne, cycloheptadecyne, 5-phenylpentyne-2, 3-cyclopentahexyne-1, eicosyne-3, and the like, and mixtures thereof. Compounds containing both double and triple bonds in the molecule can be utilized including, for example, 1-hexen-5-yne, 1,5-hexadien-3-yne, and others.

The catalysts of the present invention comprise a major proportion of a suitable catalyst support material, a minor proportion of a promoting material and still another minor proportion of one or more metal oxides selected from the series of rare earth metals having atomic numbers from 57 through 71, inclusive, namely lanthanum, cerium, praseodymium, neodymium, promethium, samarium, europium, gadolinium, terbium, dysprosium, holmium, erbium, thulium, ytterbium, and lutetium. The catalyst support materials are selected from silica, alumina and aluminum phosphate. Preferably the surface area should be at least about 1 m²/g.

The promoter is selected from tungsten oxide, molybdenum oxide and rhenium oxide. Generally, the catalyst contains the promoting component in amounts ranging from about 0.1 to about 30, preferably from about 1 to about 15 weight percent (calculated as the trioxide in the case of tungsten and molybdenum and as the heptoxide in the case of rhenium) based on the weight of the total catalytic composition. The amount of rare earth metal oxide (calculated as $M_2O_3$ wherein M is the rare earth metal) is in the range from about 0.1 to about 10 weight percent, preferably from about 0.5 to about 5 weight percent based upon the weight of the total catalytic composition. Thus some examples of catalysts of this invention are $WO_3/Sm_2O_3/SiO_2$, $WO_3/Pr_2O_3/SiO_2$, $WO_3/Nd_2O_3/SiO_2$, $WO_3/CeO_2/SiO_2$, $WO_3/Yb_2O_3/SiO_3$, $MoO_3/La_2O_3/Al_2O_3$, $Re_2O_7/Eu_2O_3/AlPO_4$, $WO_3/Gd_2O_3/AlPO_4$, $MoO_3/Dy_2O_3/SiO_2$, $Re_2O_7/Ho_2O_3/Al_2O_3$ and $WO_3/Lu_2O_3/Al_2O_3$.

Mixtures of promoters and/or supports may be utilized where desired.

The above-described components of the present invention catalyst can be combined in any suitable way. Thus, typical catalyst preparation techniques such as coprecipitation, dry mixing, impregnation, and the like, can be used. It is presently preferred to first form the support material and then to incorporate the olefin reaction promoting component and the rare earth metal component into the support while the support is either in the soft wet gel stage or in the hard dry gel stage. These components can be associated with the support in any order.

The impregnation technique of incorporation is presently preferred and any soluble compound of tungsten, molybdenum, rhenium, or rare earth metal which is soluble in either aqueous or organic solvents and which is an oxide or a compound convertible to an oxide on calcination can be used. Some examples are water soluble compounds such as ammonium metatungstate, ammonium molybdate, ammonium perrhenate, cerium acetate, praseodymium chloride, samarium bromate, and the like. In addition, alcoholic solutions of compounds such as ytterbium chloride, lanthanum nitrate, or various organo complexes of these metals can be used such as the ethylenediaminetetraacetate complexes.

After incorporation of all the components of the catalyst, the composite is generally dried and then calcined. If desired, the composite can be calcined after incorporation of each of the metal-containing components. The calcination can take place at 600°–1500°F., preferably 900°–1200°F., generally in the presence of an oxygen-containing gas such as flowing dry air. The calcination should be carried out under dry conditions, although steam can sometimes be present in the early stages of the heating of the catalyst compound in order to stabilize the components at that point. After the calcination, the catalyst can be flushed or contacted with other gases which do not interfere with the subsequent conversion. The finished catalyst can be in any conventional form such as pills, powder, agglomerates, extrudates, and the like.

The applicable unsaturated feedstocks are converted by the process of the present invention by contact with a catalyst, under reaction conditions, either batchwise or continuously, in vapor phase or liquid phase, using any suitable mode of contact or reaction apparatus. The process can be carried out either in the presence or absence of a diluent. Diluents comprising paraffinic and cycloparaffinic hydrocarbons can be employed. Suitable diluents are, for example, propane, cyclohexane, methylcyclohexane, normal pentane, normal hexane, isooctane, dodecane, and the like, or mixtures thereof, including primarily those paraffins and cycloparaffins having up to 12 carbon atoms per molecule. The diluent should be nonreactive under the conditions of the reaction. In some instances the use of the diluent can increase the selectivity of the conversion to primary products.

When reacting alkynes olefins can be present in the reaction mixture and, for the most part, an olefin linkage, whether in the alkyne reactant or in another compound present in the reaction mixture, will not enter into the alkyne reaction or into an analogous reaction with another olefinic linkage.

Any convenient pressure can be used, and pressures in the range from about 0 to about 2000 psig are generally suitable. In continuous processes, the feed rate will vary according to the feedstock being converted and the desired degree of conversion but will generally be in the range from about 0.5 to about 1000 WHSV. In batch operations, the reaction time can range from 0.1 to 20 hours. The reaction temperature can vary depending upon the nature of the support material and the olefin reaction promoting component material of the specific catalyst used. In general, the broad and preferred ranges for the reaction temperatures of different catalysts correspond to those in the following table.

| Catalyst | Broad, °F. | Preferred, °F. |
|---|---|---|
| RE Oxide/WO$_3$/SiO$_2$ | 400–1100 | 600–900 |
| RE Oxide/WO$_3$/Al$_2$O$_3$ | 150–700 | 500–600 |
| RE Oxide/WO$_3$/AlPO$_4$ | 600–1200 | 700–900 |
| RE Oxide/Mo$_2$O$_3$/SiO$_2$ | 600–1100 | 800–1000 |
| RE Oxide/Mo$_2$O$_3$/Al$_2$O$_3$ | 150–500 | 200–400 |
| RE Oxide/Mo$_2$O$_3$/AlPO$_4$ | 600–1200 | 700–900 |
| RE Oxide/Re$_2$O$_7$/SiO$_2$ | 300–1100 | 600–900 |
| RE Oxide/Re$_2$O$_7$/Al$_2$O$_3$ | −60–1000 | 100–500 |
| RE Oxide/Re$_2$O$_7$/AlPO$_4$ | −60–1000 | 100–500 |

After leaving the reaction zone, the reaction mixture can be separated by any conventional means and the desired products isolated and recovered. Unconverted or incompletely converted materials can be recycled through the reaction zone if desired.

The following examples illustrate the process of the invention.

EXAMPLE I

Octene-1 was disproportionated in a number of runs using a WO$_3$/SiO$_2$ catalyst which had been also copromoted with a number of rare earth metal oxides. In each case, the catalyst contained 8 weight percent tungsten oxide and 1 weight percent rare earth oxide.

The catalysts were prepared by impregnating 20–40 mesh catalytic silica gel with an aqueous solution which contained both a suitable quantity of ammonium metatungstate and a suitable quantity of the rare earth metal nitrate. In a specific example, 10 g of the 20–40 mesh silica was impregnated by a solution containing 0.94 g ammonium metatungstate and 0.17 g Nd(NO$_3$)$_3$.5H$_2$O. This solution was added in small increments to the silica gel with drying over a steam bath between additions. For purposes of comparison, a similar catalyst was prepared containing 8 weight percent tungsten oxide but contained no rare earth metal oxide.

In each of the runs, 5 ml of the catalyst was charged into a tubular fixed bed reactor. Two ml of glass beads were located upstream of the catalyst bed for preheating purposes. The catalyst bed was then treated dry flowing air at 1000°F. for one hour and then cooled down to operating temperature in flowing nitrogen.

The conditions for the disproportionation of octene-1 in each of the runs were as follows: space rate, 3 WHSV; pressure, atmospheric; temperature, 750°F. The effluent of each of the 30–120 minute reaction periods of the run was collected and subjected to analysis. The results of these runs are shown in the following Table I.

Table I

| Disproportionation of Octene-1 over WO$_3$/SiO$_2$ ||| 
|---|---|---|
| Run | RE Oxide Copromoter | Disp. Conv. % |
| 1 | None | 45* |
| 2 | 1 Wt. % Nd$_2$O$_3$ | 70 |
| 3 | 1 Wt. % Pr$_2$O$_3$ | 83 |
| 4 | 1 Wt. % Sm$_2$O$_3$ | 89 |

*Average of two runs.

The data in the above table show that the copromotion of the WO$_3$/SiO$_2$ catalyst with either of three different rare earth oxides resulted in significant increases in the disproportionation conversion of octene-1.

EXAMPLE II

Using the same general procedure and the same rare earth metal oxide-promoted catalysts of Example I, propylene was disproportionated to ethylene and butenes in several different runs under several sets of conditions. The essential conditions of these runs as well as the results are shown in Table II below.

Table II

| Run | RE Oxide Copromoter | Disproportionation of Propylene over $WO_3/SiO_2$ | | |
|---|---|---|---|---|
| | | 625°F. 300 psig 225 WHSV | 745°F. 300 psig 50 WHSV | 725°F. 300 psig 70 WHSV |
| Disproportionation Conversions | | | | |
| 5 | None | 24.4 | 32.0* | 24.7 |
| 6 | 1 Wt. % $Sm_2O_3$ | 38.6 | 39.8 | 31.3 |
| 7 | 1 Wt. % $Nd_2O_3$ | 33.2 | 39.0 | — |
| 8 | 1 Wt. % $Pr_2O_3$ | — | — | 29.3 |
| Weight % Butene-1 in Total $C_4$ Product | | | | |
| 5 | None | — | 8.8* | 8.7 |
| 6 | 1 Wt. % $Sm_2O_3$ | — | 3.4 | 4.6 |
| 7 | 1 Wt. % $Nd_2O_3$ | — | 7.4 | — |
| 8 | 1 Wt. % $Pr_2O_3$ | — | — | 4.6 |
| Percent Selectivity to Ethylene and Butenes | | | | |
| 5 | None | 97.4 | 98.5 | 97.7 |
| 6 | 1 Wt. % $Sm_2O_3$ | 100 | 98.3 | 98.2 |
| 7 | 1 Wt. % $Nd_2O_3$ | 100 | 95.5 | — |
| 8 | 1 Wt. % $Pr_2O_3$ | — | — | 98.8 |

*Average of two runs.

The data in the table above show that, under several sets of conditions, the catalysts which were promoted with the rare earth metal oxides were found, in each case, to increase the disproportionation conversion of propylene. In addition, it was also found in several cases that the reaction effluent from the runs using the rare earth metal oxide-promoted catalysts contained significantly less butene-1 product. Because the primary product of the propylene disproportionation is butene-2, this indicates that, in these runs, there was significantly less double bond isomerization activity in the reaction zone. This was also reflected in the portion of the table which shows the selectivity of each of these runs. In most of the runs in which the rare earth metal oxide copromoters were present, the selectivity to primary disproportionation products was somewhat higher.

In several other qualitative runs in which $WO_3/SiO_2$ catalysts containing 8 weight percent $WO_3$ were also copromoted with 0.5 weight percent $CeO_2$ or 0.5 weight percent $Yb_2O_3$ similar good conversion results were obtained for the disproportionation of octene-1.

As used in the claims in this application the term "convertible unsaturated reactant" includes olefinically unsaturated compounds convertible according to the olefin reaction and acetylenically unsaturated compounds convertible according to the alkyne reaction. The "defined reaction" includes the olefin reaction and the alkyne reaction as defined hereinabove and can be visualized as comprising the reaction between two first pairs of carbon atoms, the two carbon atoms of each first pair being connected by an unsaturated bond, to form two new pairs from the carbon atoms of said first pairs, the two carbon atoms of each of said new pairs being connected by an unsaturated bond.

What is claimed is:

1. A process for converting an unsaturated compound which comprises contacting at least one convertible unsaturated reactant selected from the group consisting of acyclic mono- and nonconjugated polyenes having at least 3 carbon atoms per molecule including cycloalkyl, cycloalkenyl, and aryl derivatives thereof; cyclic mono- and polyenes having at least 4 carbon atoms per molecule including alkyl and aryl derivatives thereof; mixtures of at least 2 of the above olefins; mixtures of ethylene and at least 1 of the above olefins; alkynes containing from 3 to about 20 carbon atoms per molecule and selected from the group consisting of cyclic and acyclic alkynes containing from 1 to about 5 triple bonds per molecule; mixtures of at least 2 of said alkynes; and mixtures of acetylene and at least 1 of the above alkynes with a catalyst comprising a promoter selected from the group consisting of oxides of tungsten, molybdenum and rhenium, on a support selected from the group consisting of silica and aluminum phosphate, and further promoted with an effective amount of an oxide of a rare earth metal having an atomic number of from 57 through 71, inclusive, under conditions suitable for converting said unsaturated reactant to a significant degree according to the olefin or alkyne reaction and the temperature is selected within the ranges in the following table for the specific catalyst utilized

| Catalyst | Temperature Range, °F. |
|---|---|
| Rare Earth Metal Oxide/Tungsten Oxide/Silica | 400–1100 |
| Rare Earth Metal Oxide/Tungsten Oxide/Aluminum Phosphate | 600–1200 |
| Rare Earth Metal Oxide/Molybdenum Oxide/Silica | 600–1100 |
| Rare Earth Metal Oxide/Molybdenum Oxide/Aluminum Phosphate | 600–1200 |
| Rare Earth Metal Oxide/Rhenium Oxide/Silica | 300–1100 |
| Rare Earth Metal Oxide/Rhenium Oxide Aluminum phosphate | –60–1000. |

2. The process of claim 1 wherein the temperature is selected from the ranges in the following table for the specific catalyst utilized

| Catalyst | Temperature Range, °F. |
|---|---|
| Rare Earth Metal Oxide/Tungsten Oxide/Silica | 600–900 |
| [Rare Earth Metal Oxide/Tungsten Oxide/Alumina] | [500–600] |
| Rare Earth Metal Oxide/Tungsten Oxide/Aluminum Phosphate | 700–900 |
| Rare Earth Metal Oxide/Molybdenum Oxide/Silica | 800–1000 |
| [Rare Earth Metal Oxide/Molybdenum Oxide/Alumina] | [200–400] |
| Rare Earth Metal Oxide/Molybdenum Oxide/Aluminum Phosphate | 700–900 |
| Rare Earth Metal Oxide/Rhenium Oxide/Silica | 600–900 |
| [Rare Earth Metal Oxide/Rhenium Oxide/Alumina] | [100–500] |
| Rare Earth Metal Oxide/Rhenium Oxide/Aluminum Phosphate | 100–500. |

3. The process of claim 1 wherein the catalyst is tungsten oxide on silica copromoted with a rare earth metal oxide.

4. The process of claim 1 wherein the convertible unsaturated reactant is selected from the group consisting of acyclic mono- and polyenes; cyclic mono- and polyenes having at least 4 carbon atoms per molecule including alkyl and aryl derivatives thereof; mixtures of at least two of the above olefins; and mixtures of ethylene and at least one of the above olefins.

5. The process of claim 1 wherein said convertible unsaturated reactant is an alkyne containing 1 triple bond per molecule; mixtures of at least 2 alkynes; and mixtures of acetylene and at least 1 alkyne.

6. The process of claim 4 wherein said convertible unsaturated reactant is a monoolefin.

7. The process of claim 1 wherein the rare earth metal oxide, calculated as $M_2O_3$ wherein M is a rare earth metal, is in the range from about 0.1 to about 10 weight percent based on the weight of the total catalytic composition.

8. The process of claim 7 wherein the amount of the rare earth metal oxide is in the range of about 0.5 to about 5 weight percent.

9. The process of claim 1 wherein the convertible unsaturated reactant is selected from the group consisting of acyclic monoolefins, including those with aryl, cycloalkyl, and cycloalkenyl substituents, having 3–20 carbon atoms per molecule with no branching closer than about the 3-position to the double bond, no quaternary carbon atoms and no aromatic substitution closer than the 4-position to the double bond, and mixtures of such unsubstituted acyclic monoolefins and mixtures of ethylene with at least 1 such unsubstituted acyclic monoolefin.

10. The process of claim 1 wherein the convertible unsaturated reactant is selected from the group consisting of acyclic, nonconjugated polyenes having from 5 to about 20 carbon atoms per molecule, containing from 2 to about 4 double bonds per molecule and having no double bond with branching nearer than the 3-position to that double bond, and having at least 1 double bond with no quaternary carbon atoms and no aromatic substitution nearer than the 4-position to that double bond, mixtures of such polyenes and mixtures of at least 1 such polyene and ethylene.

11. The process of claim 1 wherein said convertible unsaturated reactant is selected from the group consisting of cyclopentene, cyclic and bicyclic monoolefins having 7 to 12 ring carbon atoms, including those substituted with up to 3 alkyl groups having up to about 5 carbon atoms, with no branching closer than the 3-position and with no quaternary carbon atoms closer than the 4-position to the double bond, and mixtures of such olefins including mixtures with cyclopentene; and a mixture of 1 or more of the above cyclic olefins with ethylene or with 1 or more unsubstituted acyclic monoolefins.

12. The process of claim 1 wherein said convertible unsaturated reactant is selected from the group consisting of cyclic and bicyclic nonconjugated polyenes having from 5 to about 12 ring carbon atoms, including those substituted with up to 3 alkyl groups having up to about 5 carbon atoms each, having at least 1 double bond with no branching closer than the 3-position and with no quaternary carbon atoms closer than the 4-position to the double bond and mixtures thereof and mixtures of 1 or more of such polyenes with 1 or more acyclic 1-olefins having 2 to about 10 carbon atoms.

* * * * *